March 5, 1957
G. R. LAWSON ET AL
2,784,305
PORTABLE AUTO TROUBLE LAMP
Filed Sept. 1, 1953
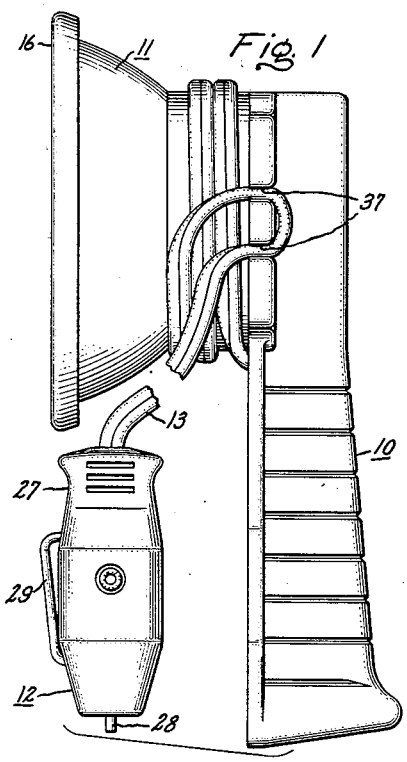
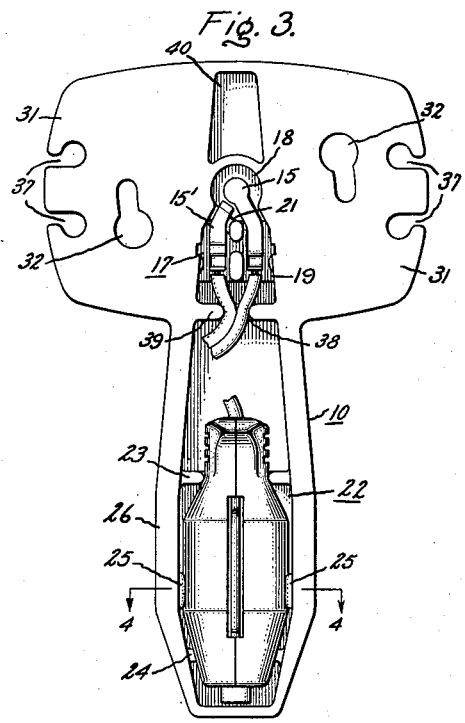
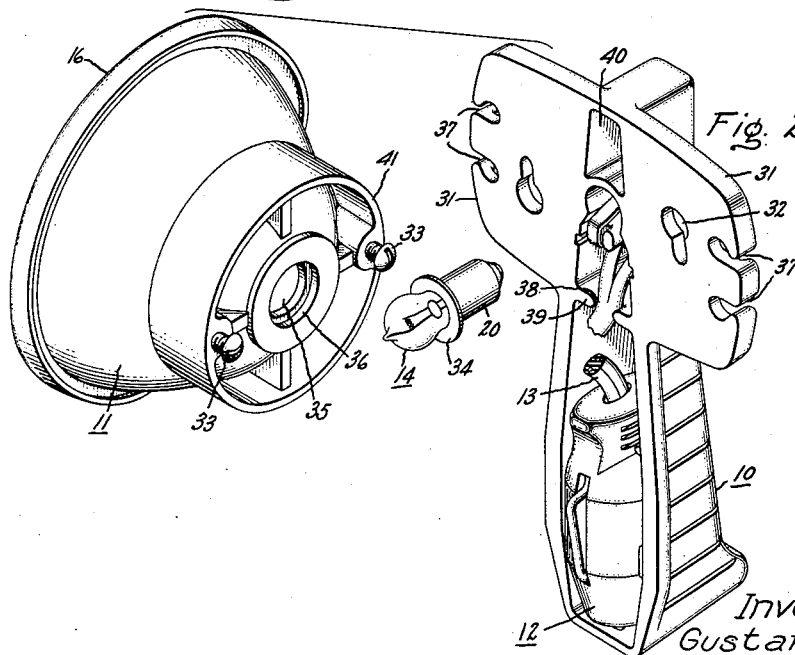
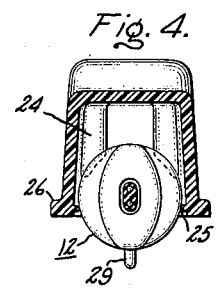
Inventors:
Gustaf R. Lawson,
Kenneth G. Johnson,
by
Their Attorney.

United States Patent Office 2,784,305
Patented Mar. 5, 1957

2,784,305

PORTABLE AUTO TROUBLE LAMP

Gustaf R. Lawson, West Warwick, and Kenneth C. Johnson, Riverside, R. I., assignors to General Electric Company, a corporation of New York Application September 1, 1953, Serial No. 377,772

9 Claims. (Cl. 240—8.18)

This invention relates to a portable trouble lamp for use in and around an automobile.

Many forms of devices have heretofore been proposed for use as a portable trouble lamp in and around an automobile. Such devices usually include a reflector for the light source, some kind of handle, and an extension cord for supplying energy to the light source. Many devices of this type are provided with an adapter which can be plugged into the usual cigarette lighter socket of an automobile and which is fastened to one end of the extension cord thereby to provide electricity for the light source from the automobile battery.

The devices of this type which have heretofore been available have been more or less satisfactory, and some have met with a measure of commercial success. However, there is still a need for an improved device.

A portable trouble lamp for automobile use should be easy to hold while in use, which indicates that it should be light in weight. It should be readily accessible when wanted; and, therefore, it must be easily stored as, for example, in the glove compartment of the automobile. In order for the lamp to have maximum usefulness, it must be provided with a relatively long extension cord. It is desirable, therefore, that suitable means be provided also for storing the extension cord and its attached connecting plug or adapter in such a way that it is readily accessible for use and easily replaced for storage. Above all, the device should be quite low in manufacturing cost.

Accordingly, it is an object of our invention to provide an improved trouble lamp and cord assembly of the type which is adapted to be plugged into the usual cigarette lighter socket of an automobile and which is compact, light in weight, easily used and stored, and relatively low in cost.

In accordance with our invention, we provide a trouble lamp having a body formed of but two main, lightweight parts; namely, a reflector portion and a handle portion. The handle portion is provided with a cavity for receiving the lamp, the pair of contact strips therefor, and the bare ends of the conductors of an extension cord. This cavity is closed by the reflector portion of the lamp body when the lamp is assembled. The handle portion is provided with a second cavity adapted to store the plug adapter which is secured to the other end of the extension cord. The device is further arranged so that the extension cord, when not in use, can be wound around the outside of the reflector portion of the lamp body, a part of the cord being secured in notches provided on the handle portion of the lamp body while the adapter is secured in the handle cavity. Because of the simplicity of construction, our invention provides a relatively low cost device.

The features of our invention, which we believe to be novel, are set forth with particularity in the appended claims. Further details of the device itself, together with further objects and advantages thereof, will best be understood by reference to the following description taken in connection with the accompanying drawing.

Figure 1 is a side elevational view of our trouble lamp showing the socket adapter removed from within the handle and connected to the handle by a length of extension cord.

Figure 2 is an exploded view showing the reflector, the lamp bulb, and the handle with the socket adapter stored therein.

Figure 3 is an elevational view of the handle showing the socket adapter stored therein.

Figure 4 is a sectional view taken along the lines 4—4 of Figure 3 showing how the socket adapter is held in the handle.

Referring to the drawing, and in particular to Figures 1 and 2, our improved portable trouble lamp includes a two-part body comprising an elongated handle 10 and a parabolic reflector 11, a socket adapter 12, an extension cord 13 which may have a length of about 12 feet, a prefocused lamp bulb 14, a center contact strip 15 and an outer contact strip 15'.

The parabolic reflector 11 is preferably made of a molded plastic material which is completely metallized or spray-coated with a light-reflecting material such as aluminum not only to increase the light reflecting characteristics of its inner surface, but also to improve its outer appearance. A transparent plastic lens 16 may be mounted over the outer rim of the reflector in order to protect the inner aluminized reflecting surface.

The elongated handle 10 preferably is similarly made of a molded plastic insulating material and has a pair of cavities formed therein. The first cavity 17 is designed to house the lamp base and lamp contacting members and to facilitate the connection of the extension cord 13 with the outer contact strip 15' and the center contact strip 15 so that the lamp bulb 14 is electrically connected in the lamp circuit. Said cavity 17 has two sections, a bulb-receiving section 18 and a section 19 wherein the terminals of the outer and center contact strips are joined with the conductors of the extension cord. The section 18 is cylindrically shaped so as to receive the plain shell base 20 of the lamp bulb 14.

The terminals of the outer and center contact strips are fixed to the bottom wall of the section 19 and to the bare end of the conductors of the cord 13 by any appropriate means known in the art. There is a partial separating wall 21 which separates sections 18 and 19 so that one end of the outer contact strip is laid over the top of the said wall and extends partially into the bulb-receiving section 18 to engage the shell base 20 of the bulb 14. The center contact strip lies on the floor of the sections 18 and 19, and forms the center contact for the base 20. The extension cord 13 is brought into the section 18 of the cavity 17 through a notch 38 formed in the wall 39 separating the cavities 17 and 22.

The second cavity 22 of the elongated handle 10 is shaped to accommodate the socket adapter 12 for storage purposes when the trouble lamp is not in use. This cavity 22 has centering projections 23 and 24, and gripping projections 25. The width of the cavity between projections 25 is normally slightly less than the thickness of the adapter. The thickness of the walls of the handle portion surrounding the cavity 22 is chosen depending upon the elasticity of the material such that they will have enough resilience to spread apart under slight pressure. When the adapter is forced into the cavity, the side walls 26 exand to allow the adapter to slide past the gripping projections 25 a distance slightly more than half the thickness of the adapter and to snap into place within the cavity. In the storage position, the centering projections 23 and 24 engage the adapter to hold the adapter in engagement with the gripping projections 25.

To release the adapter from the handle, it is merely necessary to take hold of the extension cord where it extends out of one end of the adapter and pull outwardly. The adapter will push against the gripping projections 25 to expand the side walls 26 of the cavity 22 to allow the adapter to snap out of the handle.

The socket adapter 12 is of a well-known type. It is made of a molded plastic material, and consists of the handle portion 27, a spring-pressed metallic center contact member 28, and a spring-like metallic side contact member 29, said metallic contact members being positioned for making electrical connection with the cigarette lighter socket which is usually mounted on the dashboard of an automobile.

Referring back to Figure 2, the upper end of the handle 10 is provided with a pair of outwardly projecting flat plates 31. Each plate has a keyhole slot 32 formed therein. A pair of diametrically opposed screws 33 are threaded into the back wall of the reflector 11. The back of the reflector portion is provided with a plane surface 41 adapted to fit tightly against the surfaces of plate 31 and thereby to cover the cavity 17 in the handle portion. The cavity 40 is formed in the upper end of the handle 10 in order to reduce the weight of the handle and hence the amount of material needed to mold this part.

The lamp is assembled in the following manner:

Center contact strip 15 and outer contact strip 15' are placed in the cavity 17 of the handle 10, and in the section 19 the two conductors at one end of the extension cord 13 are electrically connected to the terminal ends of the strips. The lamp bulb 14 is then inserted into the bulb-receiving section 18. The bulb 14 has a circumferential flange 34 at the top portion of the base 20. The reflector is fixed to the handle by inserting the heads of the screws 33 through the wide portions of the slots 32 and twisting the reflector and handle relative to each other so that the screws are located in the narrow portions of the slots. A screw driver is then used to tighten the screws against the backs of the plates 31. This construction makes possible the easy replacement of a lamp.

The lamp bulb 14 extends through the centrally located aperture 35 in the back of the reflector 11 and is held in place by the flange 34 engaging in a circular cutout portion 36 around the hole 35, thereby positioning the lamp to assure the proper focus thereof.

The outer edge of each flat plate 31 has a pair of snubbing notches 37 which are used to hold a portion of the cord to the handle member. It is advantageous to provide a similar pair of notches 37 on both flat plates 31 because it is not always possible to wind the cord on the built-in reel in the same manner. One time it will be possible to fasten the cord in the notches and then snap the adapter in the handle without any difficulty. The next time, due to the indiscriminate manner in which the cord is wound, the end of the cord will be too short to allow the use of the same notches as used before and still have enough length of cord to snap the adapter into the handle. The procedure to follow when this situation arises is to use the alternate pair on the opposite side of the handle. Then there will be an adequate length of cord to allow the storage of the adapter in the handle.

It will be noted that the reflector portion and handle portion of the trouble lamp body are shaped so that in cooperation with each other they form a flanged spool, or reel, adapted to receive the extension cord, or a portion of it, when not in use.

As is shown in Figure 1, the extension cord is wound around the outer surface of the reflector 11 in the annular recess. The end portion of the cord is slipped into the notches 37 and then the adapter 12 is snapped into the handle 10. This arrangement provides a compact construction which compares favorably in size and shape with the ordinary 2-cell flashlight. When placed in the glove compartment of an automobile, our trouble light occupies a minimum amount of space.

If a person desires to use the lamp to read a map while sitting in his automobile, it is only necessary to remove the adapter from the handle, disconnect the cord from the pair of notched openings, unwind several turns of the cord from the built-in reel, and fasten the cord again to the pair of snubbing notches as is clearly shown in Figure 1. Then the user has available a lamp with several feet of extension cord; the unused length of the cord being stored neatly on the built-in reel formed between the back of the reflector and the handle portion.

Our lamp is of simple construction requiring a minimum number of parts and the least number of hand operations in assembling the parts in the manufacturing process. The parts are of strong construction, but yet of light weight. The complete unit weighs just six ounces.

While the present invention has been described by reference to particular embodiments thereof, it is to be understood that numerous modifications may be made by those skilled in the art without actually departing from the invention. We, therefore, claim in the appended claims to cover all such equivalent variations as come within the true spirit and scope of the foregoing disclosure.

What we claim as new and desire to secure by Letters Patent of the United States is:

1. A portable lamp with a body comprising a reflector and a recessed handle that is open along one side, the recess in the handle being divided by a partition into at least two open compartments, the first compartment including a lamp base-receiving socket and electrical contacts fixed within the socket, a lamp supported in the socket, and an extension cord fastened to the terminal ends of the contacts for connecting the lamp in an electrical circuit, a socket adapter mounted on the free end of the cord, the second compartment being complementary to the shape of the adapter so that the adapter may be stored therein, the reflector being fastened over the first compartment to enclose the exposed electrical parts, while the second compartment remains open to facilitate the insertion and removal of the adapter from the handle.

2. A portable lamp with a body comprising a reflector and a recessed handle that is open along one side, the recess in the handle being divided by a partition into at least two open compartments, the first compartment including a cylindrical lamp base-receiving socket and electrical contacts fixed within the socket, a lamp having a cylindrical base with an annular flange extending around the base adjacent the midportion of the lamp, and an extension cord fastened to the terminal ends of the contacts for connecting the lamp in an electrical circuit, the reflector being fastened over the first compartment to enclose the exposed electrical parts and to bear against the annular flange of the lamp to hold it securely against the contacts within the socket.

3. A portable lamp comprising a body of insulating material having a reflector and a recessed handle that is open along one side, the recess in the handle being divided by a partition into at least two open compartments, the first compartment including a lamp base-receiving socket and electrical contacts fixed within the socket, a lamp supported in the socket, and an extension cord fastened to the terminal ends of the contacts for connecting the lamp in an electrical circuit, a socket adapter mounted on the free end of the cord, the second compartment being complementary to the shape of the adapter so that the adapter may be stored therein, the reflector being fastened over the first compartment to enclose the exposed electrical parts, while the second compartment remains open to facilitate the insertion and removal of the adapter from the handle, the outer surface of the reflector comprising a built-in reel on which the cord may be wound when only a short length of cord is needed, and at least one wall plate extending from the side of the handle adjacent the first compartment and provided with a snubbing notch along one outer edge thereof so that the cord may be clamped therein to hold the cord neatly wound over the reflector.

4. A portable lamp as recited in claim 3 wherein there is a pair of wall plates each extending from opposite sides of the handle adjacent the first compartment, each plate containing at least one snubbing notch to provide alternate means for fastening the cord therein.

5. A portable lamp as recited in claim 3 wherein the second compartment has resilient side walls with locking projections mounted on the opposite inner surfaces thereof so that the walls are sprung apart when the adapter is forced into the handle until the locking projections snap behind the adapter to hold it firmly in place.

6. A portable lamp comprising a reflector and a handle, an aperture in the back of the reflector for receiving the illuminating portion of a lamp, a recess at one end of the handle including a lamp base-receiving socket with electrical contacts fixed therein, a lamp supported in the socket, and an extension cord fastened to the terminal ends of the contacts for connecting the lamp in an electrical circuit, side plates formed on the handle on opposite sides of the outer face of the said socket, while the reflector is fastened over the socket and to the side plates by screw fasteners to receive the said lamp therein and cover the exposed electrical contacts, the opposite end of the handle having a hand-gripping portion.

7. A portable lamp as recited in claim 6 wherein the reflector is parabolic and serves as a built-in reel for winding the cord, the said side plates extending outwardly from the reflector as a side flange of the reel.

8. A portable lamp as recited in claim 7 wherein snubbing notches are formed in the outer edge of the side plates so that the cord may be clamped therein to hold the cord neatly wound over the reflector.

9. A portable lamp comprising a reflector and a handle that is arranged perpendicularly with respect to the center axis of the reflector, the handle having at least one compartment open along one side thereof, this compartment including a lamp base-receiving socket and electrical contacts fixed within the socket, a lamp supported in the socket, and an extension cord fastened to the terminal ends of the contacts for connecting the lamp in an electrical circuit, side plates formed on the handle on opposite sides of the lamp socket and adjacent the outermost edge thereof, the reflector being fastened over the lamp and to the side plates, while snubbing notches are formed in the outer edge of the side plates, the outer surface of the reflector serving as a built-in reel for winding the cord, so that the cord may be clamped in the snubbing notches to hold the cord neatly wound over the reflector, one end of the handle having a hand-gripping portion.

References Cited in the file of this patent

UNITED STATES PATENTS

| | | |
|---|---|---|
| 670,552 | Brown | Mar. 26, 1901 |
| 982,651 | Wellman | Jan. 24, 1911 |
| 2,304,433 | Zimmer | Dec. 8, 1942 |
| 2,655,592 | Michel et al. | Oct. 13, 1953 |
| 2,658,136 | Morgenstern et al. | Nov. 3, 1953 |